No. 725,610. PATENTED APR. 14, 1903.
W. M. WOSSOFF.
PIPE COUPLING.
APPLICATION FILED APR. 22, 1901.
NO MODEL.

Witnesses:
Murray C. Boyer
Herman E. Metius

Inventor:
William M. Wossoff,
by his Attorneys,
Hmm & Hmm

UNITED STATES PATENT OFFICE.

WILLIAM M. WOSSOFF, OF PHILADELPHIA, PENNSYLVANIA.

PIPE-COUPLING.

SPECIFICATION forming part of Letters Patent No. 725,610, dated April 14, 1903.

Application filed April 22, 1901. Serial No. 56,938. (No model.)

*To all whom it may concern:*

Be it known that I, WILLIAM M. WOSSOFF, a citizen of the United States, residing in Philadelphia, Pennsylvania, have invented certain Improvements in Couplings, of which the following is a specification.

My invention relates to couplings formed of interlocking coacting members serving to connect pipes, rods, cables, and other similar members; and it consists of a new and improved structure of this class which can be quickly and readily applied to unthreaded rods and pipes, the meeting ends of cables, or to repair breaks in pipes or tubes.

My improved coupling is of such construction that it allows for the expansion and contraction of the members coupled by the same, a particularly necessary feature when pipes or tubes carrying steam are coupled thereby.

My invention is fully illustrated in the accompanying drawings, in which—

Figure 1:
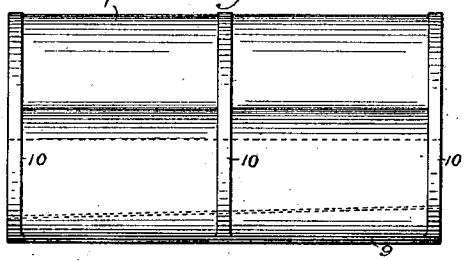
Figure 3:
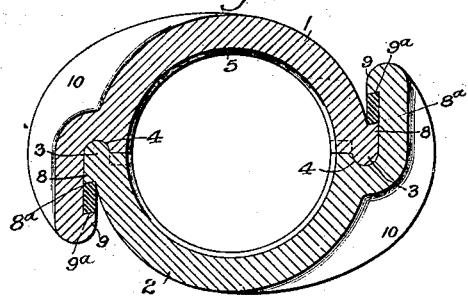
Figure 2:
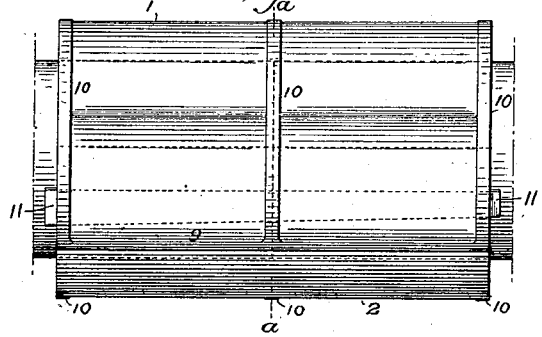
Figure 4:
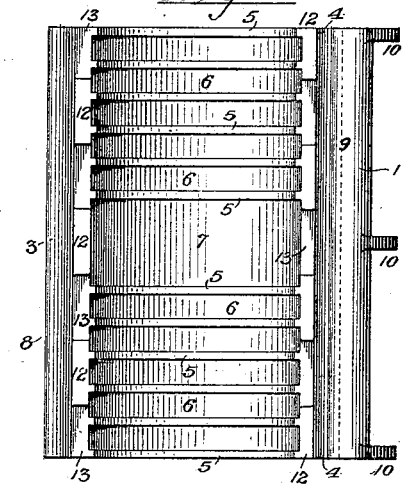
Figure 6:
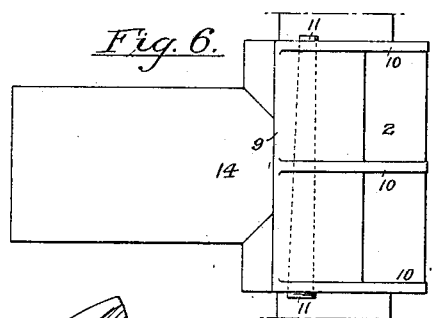
Figure 7:
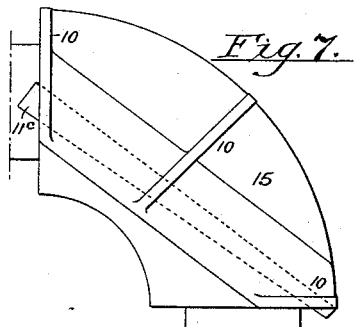
Figure 8:
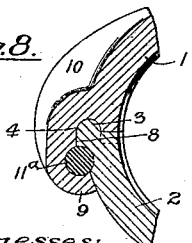
Figures 5, 9:
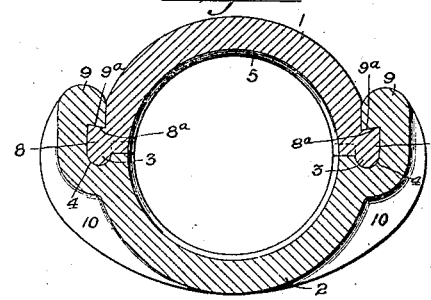

Figure 1 is a side elevation of the two halves of the preferred form of coupling ready to be fitted together, the lower half being shown in section. Fig. 2 is a side elevation of the coupling fitted together over meeting pipe ends and secured by the wedging means. Fig. 3 is a cross-sectional view of the coupling, taken on the line $a$ $a$, Fig. 2. Fig. 4 is a plan view of one of the halves of the coupling, showing the interior construction of the same. Fig. 5 is a cross-section similar to Fig. 3, illustrating a modified form of the coupling. Figs. 6 and 7 illustrate modified forms of the coupling adapted to form T and elbow joints, and Figs. 8 and 9 illustrate details of the invention.

Referring to Figs. 1, 2, 3, and 4 of the drawings, the body of the coupling consists of the semicylindrical shells 1 and 2, which when fitted together will form a hollow cylinder to approximately fit the piping or other members for which the coupling is required. The meeting faces of each half of the coupling are provided with tongue-and-groove joints. In the present instance I have shown the tongues 3 of semicircular shape fitting grooves 4 of similar shape. On the curved inner surface of the shells 1, as is shown particularly in Fig. 4, I form a series of ribs 5, between which the grooves 6 are located, and these ribs 5 serve to grip the pipes or other members connected by the coupling when the latter is locked in position. Soft metal or any other suitable form of packing material—for instance, red lead—may be used to fill the space 7 between the two inner ribs 5, as well as the grooves 4, into which the tongues 3 fit. In some instances I may fill the grooves 6 with red lead or other packing material.

To secure the two halves of the coupling together when fitted over the pipe or pipes, I form on one side of each half outwardly-projecting lugs 8 and on the other side of each half corresponding inwardly-projecting lugs 9, adapted to hook over the lugs 8. The lugs 8 and 9 are made continuous along the sides of each half of the coupling, and to reinforce the lugs 9 I arrange a series of ribs 10 on the outside of the coupling, as clearly shown in the drawings. The lower edge of the lugs 8 of each section of the coupling is parallel to a line drawn through the center of the coupling; but the lower edge of the inwardly-projecting lug 9 of the section 1 is inclined in one direction and the lower edge 9 of the section 2 is inclined in the opposite direction. This inclination is of slight extent—say about a sixteenth of an inch—so that wedge-pieces 11 may be driven in from the wider end (at opposite ends of the coupling) when the halves of the coupling are fitted together. Both the lugs 8 and 9 are undercut at 8ª and 9ª, respectively, and the wedge-pieces are beveled to correspond. By this means the two halves of the coupling are securely clamped together over the meeting ends of the pipes or other members to make a tight joint.

For the purpose of locking the sections of the coupling together I prefer to use the flat pieces shown in Fig. 3, having the beveled edge, forming with the undercut lugs 8 and 9 a dovetailed joint, such pieces being rhomboidal in cross-section. Instead of such wedging-piece I may use that illustrated in Fig. 8, which is simply a round tapered pin 11ª, or I may use a wedge having the cross-section of a rhombus, as shown at 11ᵇ in Fig. 9.

For convenience of manufacture I prefer to make each half of the coupling with inwardly-projecting lugs 9 on one side and outwardly-projecting lugs 8 on the other side, and when both lugs 9 are inclined in the same direction the sections of the couplings will be interchangeable. When so made, they may be fitted together without the additional wedging-pieces, especially when fitting the couplings on smooth surfaces, as the corresponding lugs 8 and 9 on each side of the coupling members will be made in the form of wedges to fit against each other by an endwise movement of one shell with respect to the other. A modification of this arrangement is shown in Fig. 5, where one half of the coupling carries the lugs 8 and the other half carries the lugs 9.

When using the coupling members which are fastened by means of the wedges, there is danger of the halves creeping when such wedges are driven into place. To prevent this action, I form a series of lugs and recesses 12 and 13 in each half adjacent to the tongue 3 and groove 4, the recesses 13 of one half being arranged to receive the lugs 12 of the other half when the two halves of the coupling are fitted together. By this means each half of the coupling will always have the same relative position to the other half. The lugs 12 and recesses 13 are both formed entirely distinct from the tongues 3 and grooves 4, so that when fitted together said tongues cover all the joints between the lugs 12 and recesses 13.

My invention may also be applied to T-couplings, as shown at 14 in Fig. 6, or to elbow-couplings, as shown at 15 in Fig. 7. In the latter case the wedge-pieces 11ᶜ are driven at an angle from the center of one end of the coupling to the extreme corner of the other end.

The essential features of the coupling which I have devised are its simplicity and efficiency and its adaptability to all forms of pipes, rods, cables, or the meeting ends of other similar members.

Having thus described my invention, I claim and desire to secure by Letters Patent—

1. A coupling consisting of two semicircular shells forming a hollow cylinder to embrace the members to be joined, packing within said shells around said members, and lugs carried by each shell, one lug having a portion projecting inwardly and the other lug having a portion projecting outwardly at each joint, with wedging means adapted to said projecting portions for clamping the shells together.

2. A coupling consisting of semicircular shells to make a hollow cylinder to embrace the members to be joined, packing within the shells around said members, lugs on the shells, one lug projecting inwardly and the other lug projecting outwardly at each joint, and wedge-pieces to drive in between such lugs, substantially as described.

3. A coupling consisting of two semicircular shells forming a hollow cylinder to embrace the members to be joined, packing within said shells around said members, ribs formed on the inner surface of each shell to grip said members at the ends of the shells, and lugs carried by each shell, one lug having a portion projecting inwardly and the other lug having a portion projecting outwardly at each joint, with wedging means adapted to said projecting portions for clamping the shells together.

4. A coupling consisting of semicircular shells to make a hollow cylinder to embrace the members to be joined, said shells being grooved on the inner surface to form ribs to grip the members joined, packing within the shells around said members, said packing being adapted to said grooves, and lugs carried by the shells, one lug projecting inwardly and the other lug projecting outwardly at each joint, with wedging means to clamp the shells together.

5. A coupling consisting of semicircular shells to make a hollow cylinder to embrace the members to be joined, packing within the shells around said members, coacting lugs and recesses carried by each shell and serving to prevent the creeping of the same when they are secured together, and lugs carried by each shell, one lug projecting inwardly and the other lug projecting outwardly at the joints, with wedging means to clamp the shells together.

6. A coupling consisting of semicircular shells to make a hollow cylinder to embrace the members to be joined, packing within the shells around said members, each of said shells having a tongue and groove fitting into each other when the coupling is clamped together, and lugs carried by each shell, one lug projecting inwardly and the other lug projecting outwardly at the joints, with wedging means to clamp the shells together.

7. A coupling consisting of semicircular shells to make a hollow cylinder to embrace the members to be joined, packing within the shells around said members, coacting lugs and recesses carried by each shell and serving to prevent the creeping of the same when they are secured together, said shells being provided with tongues and grooves fitting each other and breaking or covering the joints of said lugs and recesses, and lugs carried by each shell, one lug projecting inwardly and the other lug projecting outwardly at the joints, with wedging means to clamp the shells together.

8. In a coupling of the character described, semicircular shells to make a hollow cylinder to embrace the members to be joined, packing within the shells around said members, lugs on the shells, one lug projecting inwardly and the other lug projecting outwardly at each joint, each of said lugs being undercut, and beveled wedge-pieces to drive in between the lugs, substantially as described.

9. In a coupling of the character described, semicircular shells to make a hollow cylinder to embrace the members to be joined, coacting lugs and recesses carried by each shell and serving to prevent the creeping of the same when they are secured together, and wedging-clamps for the shells.

10. In a coupling of the character described, semicircular shells to make a hollow cylinder to embrace the members to be joined, coacting lugs and recesses carried by each shell and serving to prevent the creeping of the same when they are secured together, said shells being provided with tongues and grooves fitting each other and adapted to receive packing, said tongues covering the joints of the lugs and recesses of each section so as to make a tight joint at this point, and wedging means to clamp the shells together.

In testimony whereof I have signed my name to this specification in the presence of two subscribing witnesses.

WILLIAM M. WOSSOFF.

Witnesses:
MURRAY C. BOYER,
JOS. H. KLEIN.